(12) United States Patent
Rajan et al.

(10) Patent No.: US 8,279,964 B2
(45) Date of Patent: Oct. 2, 2012

(54) DATA TRANSMISSION IN WIRELESS COMMUNICATION SYSTEM

(75) Inventors: Balaji Sundar Rajan, Bangalore (IN); Pavan Koteshwar Srinath, Bangalore (IN)

(73) Assignee: Indian Institute of Science, Bangalore, Karnataka (IN)

( * ) Notice: Subject to any disclaimer, the term of this patent is extended or adjusted under 35 U.S.C. 154(b) by 767 days.

(21) Appl. No.: 12/420,968

(22) Filed: Apr. 9, 2009

(65) Prior Publication Data
US 2010/0260279 A1 Oct. 14, 2010

(51) Int. Cl.
*H04B 7/02* (2006.01)
*H04L 27/00* (2006.01)

(52) U.S. Cl. ........................................ 375/267; 375/295

(58) Field of Classification Search .................. 375/267, 375/295, 299, 347, 349; 700/53; 455/101, 455/132–141
See application file for complete search history.

(56) References Cited

U.S. PATENT DOCUMENTS
7,586,997 B2 * 9/2009 Vummintala et al. ......... 375/299

OTHER PUBLICATIONS

Alamouti, S. M., "A Simple Transmit Diversity Technique for Wireless Communications", IEEE J. Select Areas Commun., Oct. 1998, vol. 16, No. 8, pp. 1451-1458.
Tarokh, V., Jafarkhani, H. and Calderbank, A. R., "Space-Time Block Codes from Orthogonal Designs", IEEE Trans. Inf. Theory, Jul. 1999, vol. 45, No. 5, pp. 1456-1467.
Belfiore, J. C.; Rekaya, G. and Viterbo, E., "The Golden Code: A 2 × 2 Full Rate Space-Time Code with Non-Vanishing Determinants," IEEE Trans. Inf. Theory, Apr. 2005, vol. 51, No. 4, pp. 1432-1436.
Dayal, P. and Varanasi, M. K., "An Optimal two Transmit Antenna Space-Time Code and its Stacked Extensions," IEEE Trans. Inf. Theory, Dec. 2005, vol. 51, No. 12, pp. 4348-4355.
Jian-Kang Zhang, Jing Liu and Kon Max Wong, "Trace-Orthonormal Full-Diversity Cyclotomic Space Time Codes," IEEE Transactions on Signal Processing , Feb. 2007, vol. 55, No. 2, pp. 618-630.
Paredes, J., Gershman, A.B. and Gharavi-Alkhansari, M., "A 2 × 2 Space-Time Code with Non-Vanishing Determinants and Fast Maximum Likelihood Decoding," in Proc IEEE International Conference on Acoustics, Speech and Signal Processing (ICASSP 2007), Apr. 15-20, 2007, vol. 2, pp. 877-880, DOI: 10.1109/ICASSP.2007. 366376.
Sezginer, S. and Sari, H., "A Full Rate Full-Diversity 2 × 2 Space-Time Code for Mobile Wimax Systems," in Proc. IEEE International Conference on Signal Processing and Communications, Dubai, Jul. 2007.

(Continued)

*Primary Examiner* — Khanh C Tran
(74) *Attorney, Agent, or Firm* — Ren-Sheng International

(57) ABSTRACT

Embodiment of the disclosure set forth methods for transmitting data in a wireless communication system. Some example methods include converting a data stream to a symbol set; selecting a first plurality of symbols from the symbol set, wherein the first plurality of symbols includes at least a first symbol, a second symbol, a third symbol, and a fourth symbol; generating a second plurality of symbols having at least a fifth symbol and a sixth symbol, wherein the fifth symbol includes a first part of the first symbol and a second part of the second symbol and the sixth symbol includes a first part of the third symbol and a second part of the fourth symbol; weighting the sixth symbol to form a first weighted symbol; and transmitting in a first time slot the fifth symbol with a first antenna and the first weighted symbol with a second antenna.

20 Claims, 5 Drawing Sheets

OTHER PUBLICATIONS

Elia, P., Kumar, K. R., Pawar, S. A., Kumar, P. V. and Lu, H., "Explicit Space-Time Codes Achieving the Diversity-Multiplexing Gain Tradeoff", IEEE Trans. Inf. Theory, Sep. 2006, vol. 52, No. 9, pp. 3869-3884.

MD., Zafar, Ali Khan, and Rajan, B. Sundar, "Single Symbol Maximum Likelihood Decodable Linear STBCs", IEEE Trans. Inf. Theory, May 2006, vol. 52, No. 5, pp. 2062-2091.

Tarokh, V., Seshadri, N. and Calderbank, A. R, "Space Time Codes for High Date Rate Wireless Communication: Performance Criterion and Code Construction", IEEE Trans. Inf. Theory, Mar. 1998, vol. 44, No. 2, pp. 744-765.

Viterbo, Emanuele and Boutros, Joseph, "A Universal Lattice Code Decoder for Fading Channels", IEEE Trans. Inf. Theory, Jul. 1999, vol. 45, No. 5, pp. 1639-1642, DOI: 10.1109/18771234.

Yao, H. and Wornell, G. W., "Achieving the Full MIMO Diversity-Multiplexing Frontier with Rotation-Based Space-Time Codes," in Proc. Allerton Conf. on Comm. Control and Comput., Monticello, IL, Oct. 2003.

Willems, F. M. J., "Rotated and Scaled Alamouti Coding", arXiv:0802.0580(cs.IT), Feb. 5, 2008, pp. 1-11.

B. Sundar Rajan et al., "A Low-Complexity, Full-Rate, Full-Diversity $2 \times 2$ STBC with Golden Code's Coding Gain," Proceedings of IEEE GLOBECOM 2008, New Orleans, Nov.-Dec. 2008.

* cited by examiner

500 A computer program product 502 at least one of one or more instructions for converting a data stream to a symbol set;

one or more instructions for selecting a first plurality of symbols from the symbol set, wherein the first plurality of symbols includes at least a first symbol, a second symbol, a third symbol, and a fourth symbol;

one or more instructions for generating a second plurality of symbols having at least a fifth symbol and a sixth symbol, wherein the fifth symbol includes a first part of the first symbol and a second part of the second symbol and the sixth symbol includes a first part of the third symbol and a second part of the fourth symbol;

one or more instructions for weighting the sixth symbol to form a first weighted symbol; or one or more instructions for transmitting in a first time slot the fifth symbol with a first antenna and the first weighted symbol with a second antenna 504 a signal bearing medium 506 a communication medium 508 a computer readable medium 510 a recordable medium

FIG. 5

DATA TRANSMISSION IN WIRELESS COMMUNICATION SYSTEM

BACKGROUND OF THE DISCLOSURE

Description of the Related Art

In a wireless communication system, a data stream to be transmitted is generally modulated and encoded and then transmitted as signals in a form of radio frequencies or infrared beams. At the receiving end, the transmitted signals are received, amplified, demodulated, and then decoded to restore the original data format. Objectives of various coding technique include, without limitation, minimizing the data transmission time and maintaining signal synchronization at both ends to ensure reliable data transmission. There are existing approaches that attempt to advance reliability and data rate of signals transmitted in a wireless communication system, many of these approaches are faced with decoding complexity or coding gain issues.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 is a block diagram illustrating a computer program product 500 for transmitting data in a wireless communication system, all arranged in accordance with embodiments of the present disclosure.

DETAILED DESCRIPTION

Figure 1:
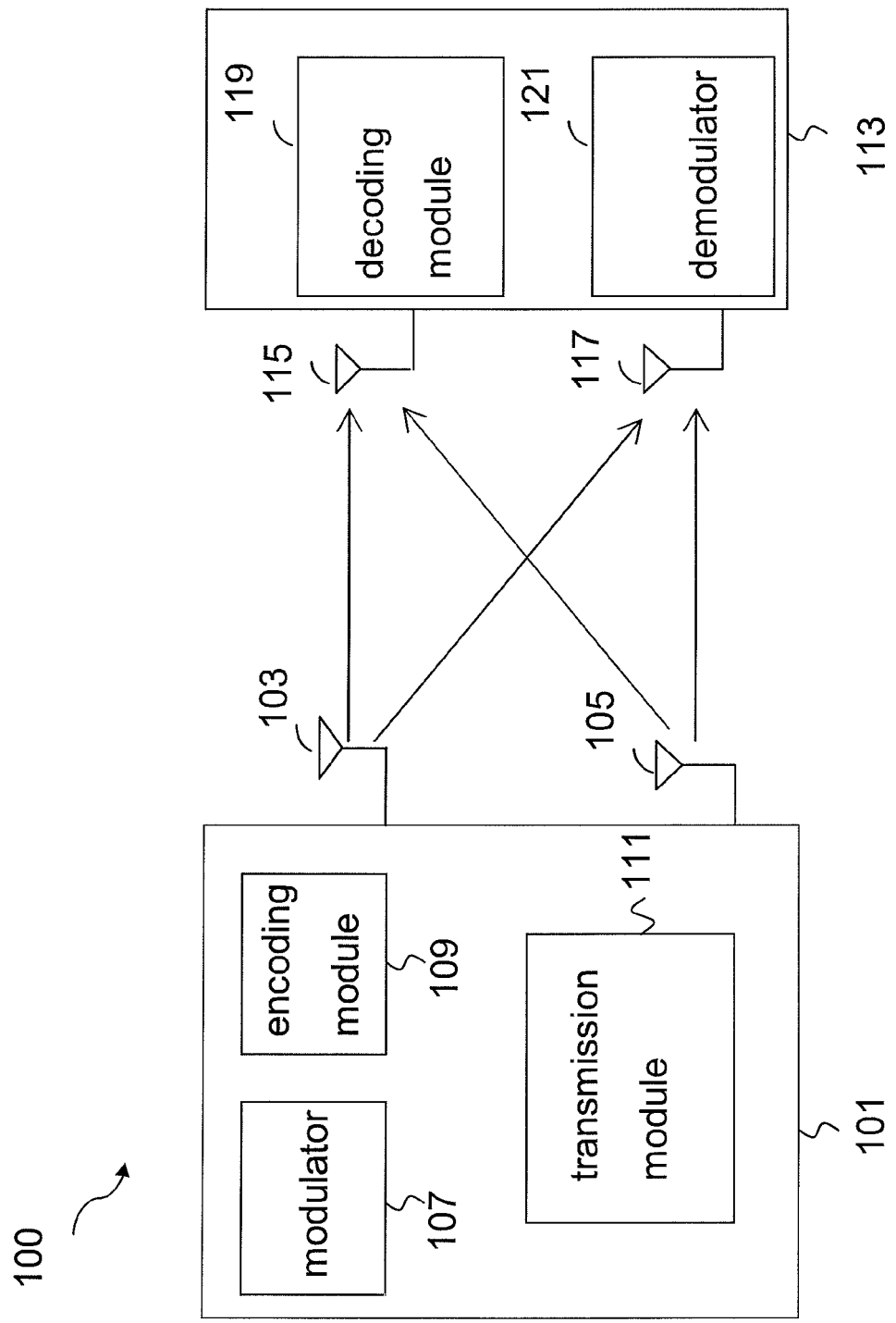
FIG. 1 illustrates one configuration of a multiple input and multiple output (MIMO) system 100 which has two transmit antennas and two receive antennas.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, interalia, to methods, apparatus, computer programs, and systems related to data transmission in a wireless network.

In this disclosure, "coding gain" refers to the measure in the difference between the signal to noise ratio (SNR) levels between the uncoded system and coded system required to reach the same bit error rate (BER) levels when used with the error correcting code (ECC). A "symbol" refers to a representation of data stream to be transmitted in a wireless communication system, where the representation is in a form of a complex number.

In this disclosure, a wireless communication system can be a multiple input and multiple output (MIMO) system. A MIMO system includes a transmitter with multiple transmit antennas and a receiver with multiple receive antennas. A data stream to be transmitted in a MIMO system is modulated and encoded at the transmitter to form a signal. The signal is then transmitted from the different transmit antennas of the transmitter to the receive antennas of the receiver in different time slots.

FIG. 1 illustrates one configuration of a MIMO system 100 which has two transmit antennas and two receive antennas, arranged in accordance with the embodiments of the present disclosure. The MIMO system 100 includes a transmitter 101 and a receiver 113. The transmitter 101 includes a plurality of transmit antennas (e.g., a first transmit antenna 103 and a second transmit antenna 105), a modulator 107, an encoding module 109, and a transmission module 111. The receiver 113 includes a plurality of receive antennas (e.g., a first receive antenna 115 and a second receive antenna 117), a decoding module 119, and a demodulator 121. Signals transmitted from the first transmit antenna 103 can be received by both the first receive antenna 115 and the second receive antenna 117. Similarly, signals transmitted from the second transmitted antenna 105 can also be received by both the first receive antenna 115 and the second receive antenna 117.

The modulator 107 modulates a data stream to be transmitted with a carrier wave. One modulation scheme is the quadrature amplitude modulation (QAM). In QAM, the data stream to be transmitted is modulated with at least two carrier waves, and the amplitudes of the two carrier waves are out of phase with each other by 90 degrees. The modulated data stream is represented as symbols, and the symbols can be mapped onto a constellation diagram, which is a two-dimensional scatter diagram in the complex plane.

The encoding module 109 is configured to follow an encoding scheme to encode the symbols and generates a matrix based on the symbols. In some implementations, rows of the matrix correspond to different time slots, and columns of the matrix correspond to the different transmit antennas of the transmitter 101. Alternatively, rows of the matrix correspond to the different transmit antennas of the transmitter 101, and columns of the matrix correspond to different time slots. Therefore, each element of the matrix represents what symbol is transmitted from a particular transmit antenna and when the symbol is transmitted. The transmission module 111 controls the first transmit antenna 103 and the second transmit antenna 105 to transmit specific symbols in particular time slots based on the matrix generated by the encoding module 109. Symbols transmitted from the transmit antennas 103 and 105 are received by both the first receive antenna 115 and the second receive antenna 117 of the receiver 113. The received symbols are then decoded by the decoding module 119 and demodulated by the demodulator 121 to covert the encoded symbols back to the original format of the data stream transmitted from the transmitter 101.

Figure 2:
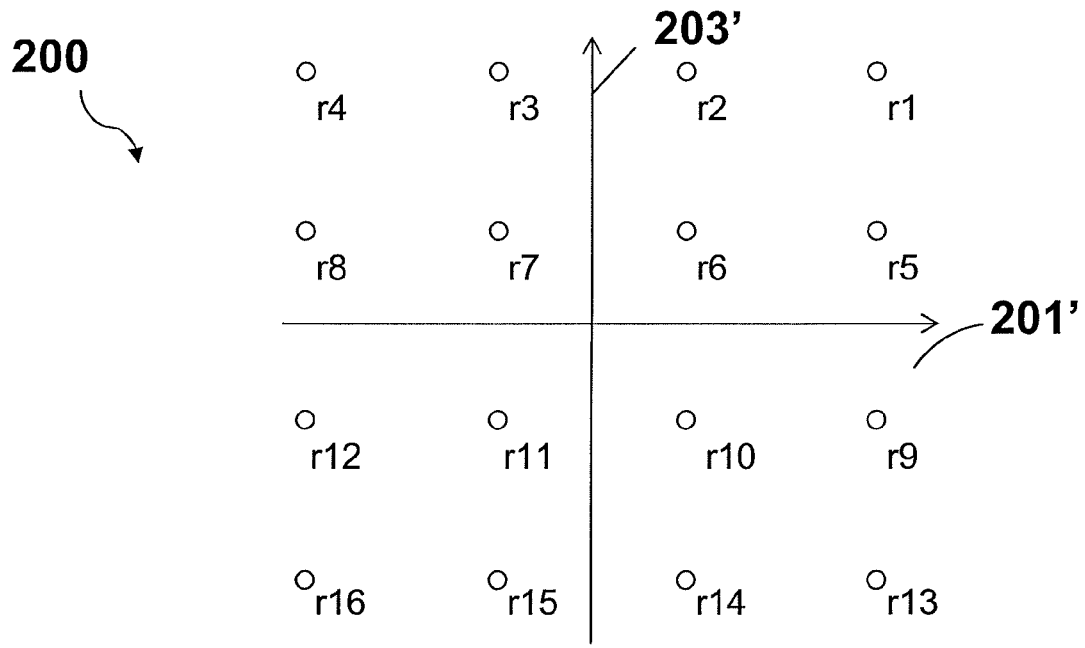
FIG. 2(a) is a regular quadrature amplitude modulation (QAM) constellation diagram 200.
FIG. 2(b) is a rotated QAM constellation diagram 210.
Figure 2:
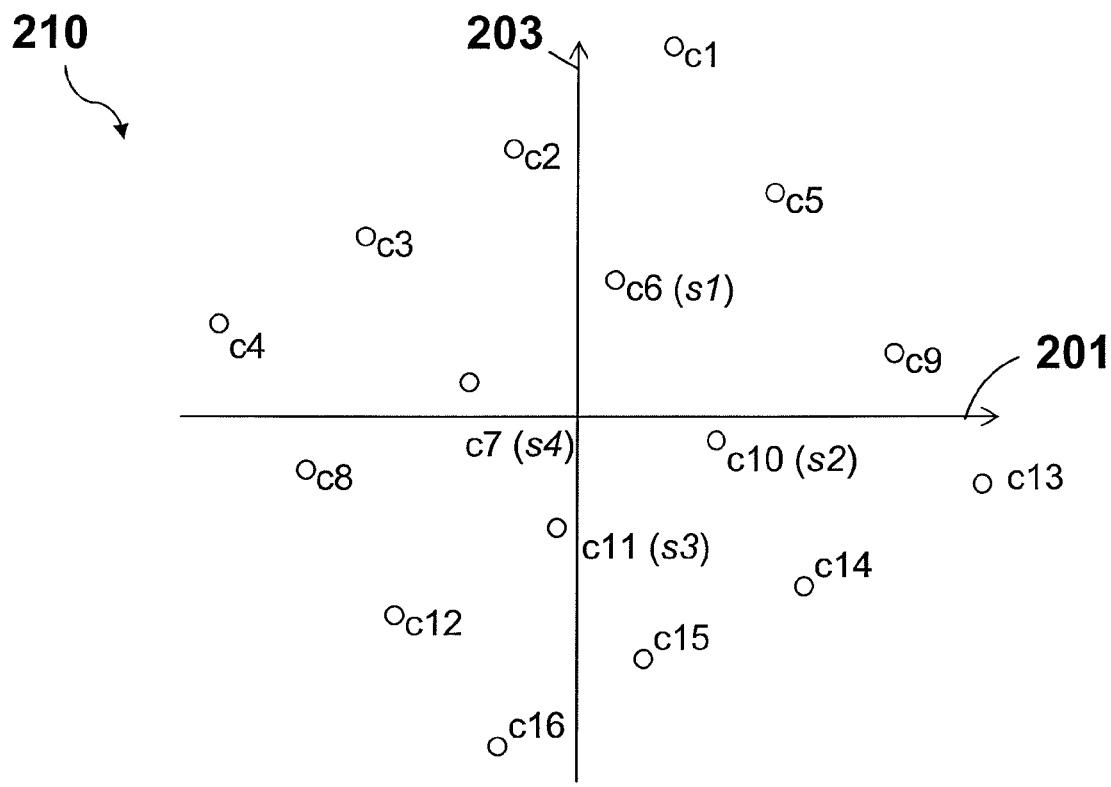

In some implementations, the encoding module 109 can encode the data stream modulated using the QAM scheme. The encoding module 109 can be configured to support a rotation scheme, a selection scheme, an interleaving scheme, a weighting scheme, and a matrix generation scheme. FIG. 2(a) is a regular 16-QAM constellation diagram 200. Each point (e.g., r1 to r16) refers to a symbol. The horizontal axis 201' represents the real axis, and the vertical axis 203' represents the imaginary axis. The real parts between certain symbols shown in FIG. 2(a) are the same. Similarly, the imaginary parts between certain symbols shown in FIG. 2(a) are also the same.

In an example embodiment, the constellation diagram 200 is rotated so that the following conditions are met: (1) the real part of any symbol is not equal to the real part of any other symbols on the constellation diagram; and (2) the imaginary part of any symbol is not equal to the imaginary part of any other symbols on the constellation diagram. The rotating scheme rotates the constellation diagram 200 with an angle θ (e.g., $$\frac{1}{2}\tan^{-1}2$$

) to form a new constellation diagram 210 illustrated in FIG. 2(b).

The selection scheme then is configured to make four selections from the constellation diagram 210. Each selection of a symbol is independent from the other selections. In some implementations, a symbol on the constellation diagram 210 (e.g., c6) may be repeatedly selected. For example, the same c6 may be selected four times. In some other implementations, the four distinct symbols (e.g., c6, c7, c10, and c11) may be selected as shown in FIG. 2(b). Regardless of which symbols are selected from the constellation diagram 210, the selected symbols are also referred to as $s_1$, $s_2$, $s_3$, and $s_4$, and satisfy the relationship, $s_i=s_{iI}+js_{iQ}$, where $s_{iI}$ and $S_{iQ}$ are the real (in-phase) and imaginary (quadrature-phase) components of $s_i$, respectively, and j represents $\sqrt{-1}$. In addition, the contellation diagram 210 is a θ radians rotated version of the constellation 200, therefore, $c_i=e^{j\theta} r_i$, i=1, 2, . . . 16, and $c_{iI}=\cos(\theta)r_{iI}-\sin(\theta)r_{iQ}$ and $c_{iQ}=\sin(\theta)r_{iI}+\cos(\theta)r_{iQ}$.

The interleaving scheme generates a first new symbol based on the real part of the first symbol and the imaginary part of the second symbol, and generates a second new symbol based on the imaginary part of the first symbol and the real part of the second symbol. For example, using the symbols above, a new complex symbol $S_1$ is formed based on a combination of the real part of symbol $s_1$ ($s_{1I}$) and the imaginary part of symbol $s_2$ ($js_{2Q}$), and a new complex symbol $S_2$ is formed based on a combination of the real part of symbol $s_2$ ($s_{2I}$) and the imaginary part of symbol $s_1$ ($js_{1Q}$). In some implementations, the interleaving scheme generates four new complex symbols $S_1$, $S_2$, $S_3$, and $S_4$ as follows:

$$S_1=s_{1I}+js_{2Q};$$

$$S_2=s_{2I}+js_{1Q};$$

$$S_3=s_{3I}+js_{4Q};$$

$$S_4=s_{4I}+js_{3Q}.$$

Thus, each interleaved symbol comprises information of two symbols from the set of symbols selected by the selection scheme.

With $S_1$, $S_2$, $S_3$, and $S_4$, the matrix generation scheme generates a first matrix (matrix (1)) as shown below:

$$\begin{bmatrix} S_1 & S_3 \\ S_4 & S_2 \end{bmatrix} \quad (1)$$

Here, $S_1=s_{1I}+js_{2Q}$, $S_2=s_{2I}+js_{1Q}$, $S_3=s_{3I}+js_{4Q}$, and $S_4=s_{4I}+js_{3Q}$. As set forth above, the matrix (1) can be used to indicate what symbol is transmitted from a particular transmit antenna and when the symbol is transmitted. Because such a matrix includes antenna and time slot information, this type of matrix is also called space-time block code (STBC) matrix. With the example STBC matrix, the transmission module 111 is able to configure the first transmit antenna 103 to transmit $S_1$ in the first time slot and transmit $S_4$ in the second time slot. In addition, the second transmit antenna 105 is configured to transmit $S_3$ in the first time slot and transmit $S_2$ in the second time slot.

In accordance with embodiments of the disclosure, the weighting scheme can weight selected elements in the matrix (1) to enhance the coding gain of the STBC. In some implementations, the weighting scheme applies weights (e.g., $e^{j\theta}$ or $\cos(\theta)+j\sin(\theta)$, where θ is in a range from zero to around π/2) to $S_3$ and $S_4$. In some implementations, θ is π/4 and the matrix generation scheme generates a second STBC matrix (matrix (2)) as follows:

$$\begin{bmatrix} S_1 & e^{j\pi/4}S_3 \\ e^{j\pi/4}S_4 & S_2 \end{bmatrix} \quad (2)$$

With the example STBC matrix, the transmission module 111 is able to configure the transmit antenna 103 to transmit $S_1$ in the first time slot and transmit $e^{j\pi/4}S_4$ in the second time slot. In addition, the transmit antenna 105 is configured to transmit $e^{j\pi/4}S_3$ in the first time slot and transmit $S_2$ in the second time slot.

The transmitted symbols are decoded and demodulated at the receiver 113. The decoding method can include any technical feasible decoding method, which includes, without limitation, maximum-likelihood decoding and sphere decoding. The demodulating method can be predetermined based on the modulation scheme adapted by the modulator 107 in the transmitter 101. The coded symbols are transmitted "full-rate." In a system having Nt transmit antennas and Nr receive antennas, the full-rate transmission refers to a code that transmits a number of complex symbols per channel use. The number of complex symbols transmitted per channel use is the minimum value selected from a group consisting of Nt and Nr. The decoding complexity of the signals encoded according to the matrix (2) and for general complex constellations is $M^3$, where M refers to the constellation size. In addition, for non-square QAM constellations, the system transmitting such encoded signals has a lower maximum-likelihood decoding complexity than the system transmitting signals encoded by the Golden Code, with comparable coding gain. The Golden Code is an optimum linear dispersion STBC for a MIMO system having two transmit antennas and two receive antennas and is associated with a decoding complexity of $M^4$. To reduce the decoding complexity, some known full-rate codes have been proposed (e.g., codes proposed by Hottinen, Tirkkonen and Wichman, Paredes, Gershman and Alkhansari and Sezginer and Sari). However, these proposed codes have less coding gains than the coding gain associated with the Golden Code.

Figure 3:
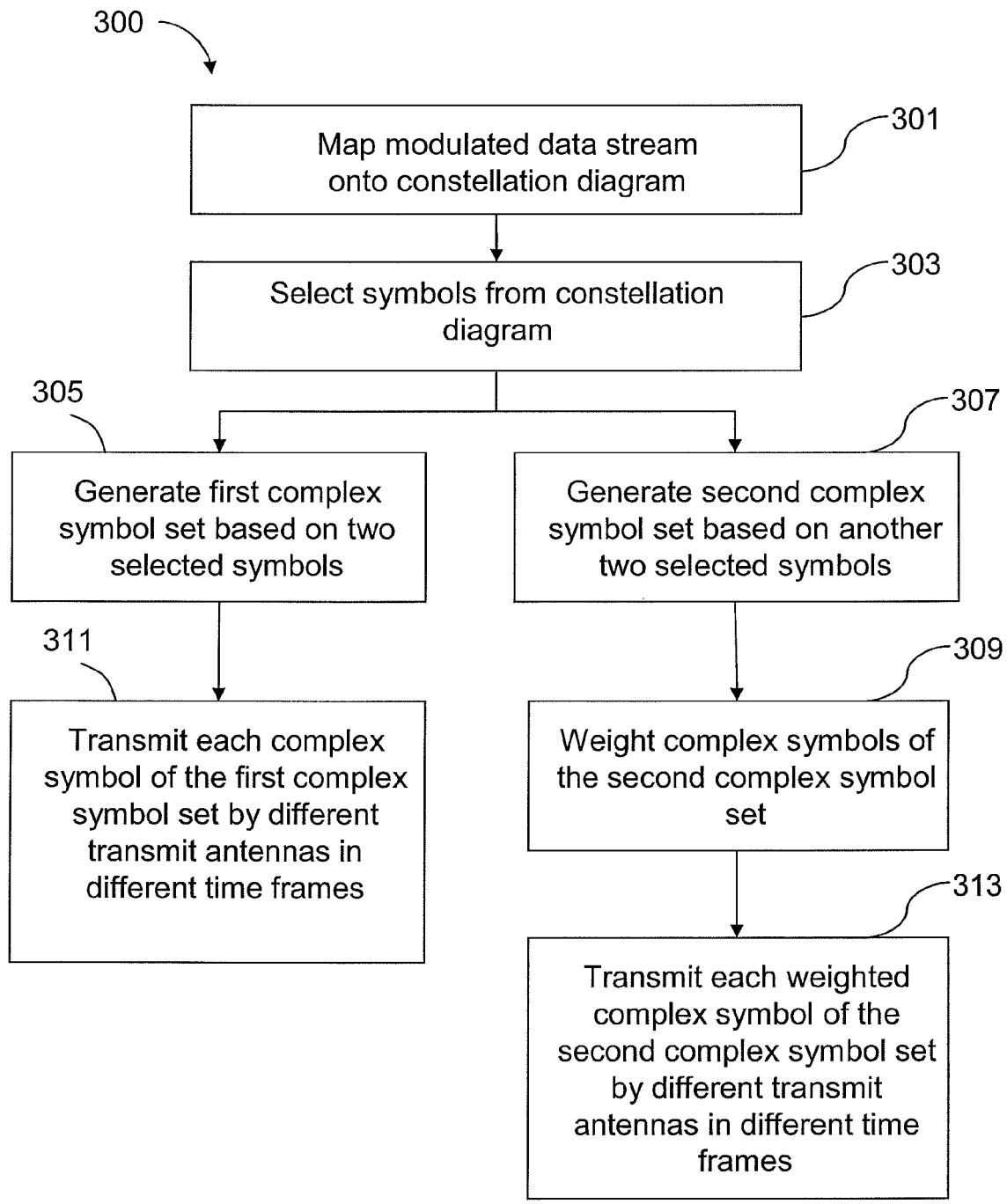
FIG. 3 is a flow chart 300 illustrating an example of method steps of encoding a data stream to be transmitted in a MIMO system.

FIG. 3 is a flow chart 300 illustrating an example of method steps of encoding a data stream to be transmitted in a MIMO system. In operation 301, a modulated data stream is represented as symbols in complex numbers and mapped onto a two-dimensional scatter diagram in the complex plane. As set forth above, such a scatter diagram can be a constellation diagram.

In some implementations, when the MIMO system includes two transmit antennas and two receive antennas, in operation 303, symbols are independently selected from the constellation diagram. In some implementations, the independently selected symbols may correspond to the same symbol on the constellation diagram 210. In some other implementations, the independently selected symbols may correspond to distinct symbols on the constellation diagram 210.

In operation 305, a first complex symbol set is generated based on two selected symbols, and a second complex symbol set is generated based on the other two selected symbols in operation 307. In some implementations, the first complex symbol set may include two complex symbols that result from interleaving the two selected symbols in a manner as set forth above. Similarly, the second complex symbol set may also include another two complex symbols that result from interleaving the other two selected symbols.

In operation 309, the complex symbols of the second complex symbol set are weighted. In some implementations, the weight applied can be $e^{j\pi/4}$. In operation 311, the two complex symbols of the first complex symbol set are transmitted by different transmit antennas in different time slots. In operation 313, the weighted complex symbols of the second complex symbol set are transmitted by different transmit antennas in different time slots.

In some implementations, the first complex symbol set includes two complex symbols (e.g., $S_1$ and $S_2$), and the second complex symbol set includes another two complex symbols (e.g., $e^{j\pi/4} S_3$ and $e^{j\pi/4} S_4$). The first transmit antenna is configured to transmit a first complex symbol (e.g., $S_1$) selected from the first complex symbol set in the first time slot and transmit a second complex symbol (e.g., $e^{j\pi/4}S_4$) selected from the second complex symbol set in the second time slot. In addition, the second transmit antenna is configured to transmit a third complex symbol ($e^{j\pi/4}S_3$) selected from the second complex symbol set in the first time slot and transmit a fourth complex symbol (e.g., $S_2$) selected from the first complex symbol set in the second time slot.

Figure 4:
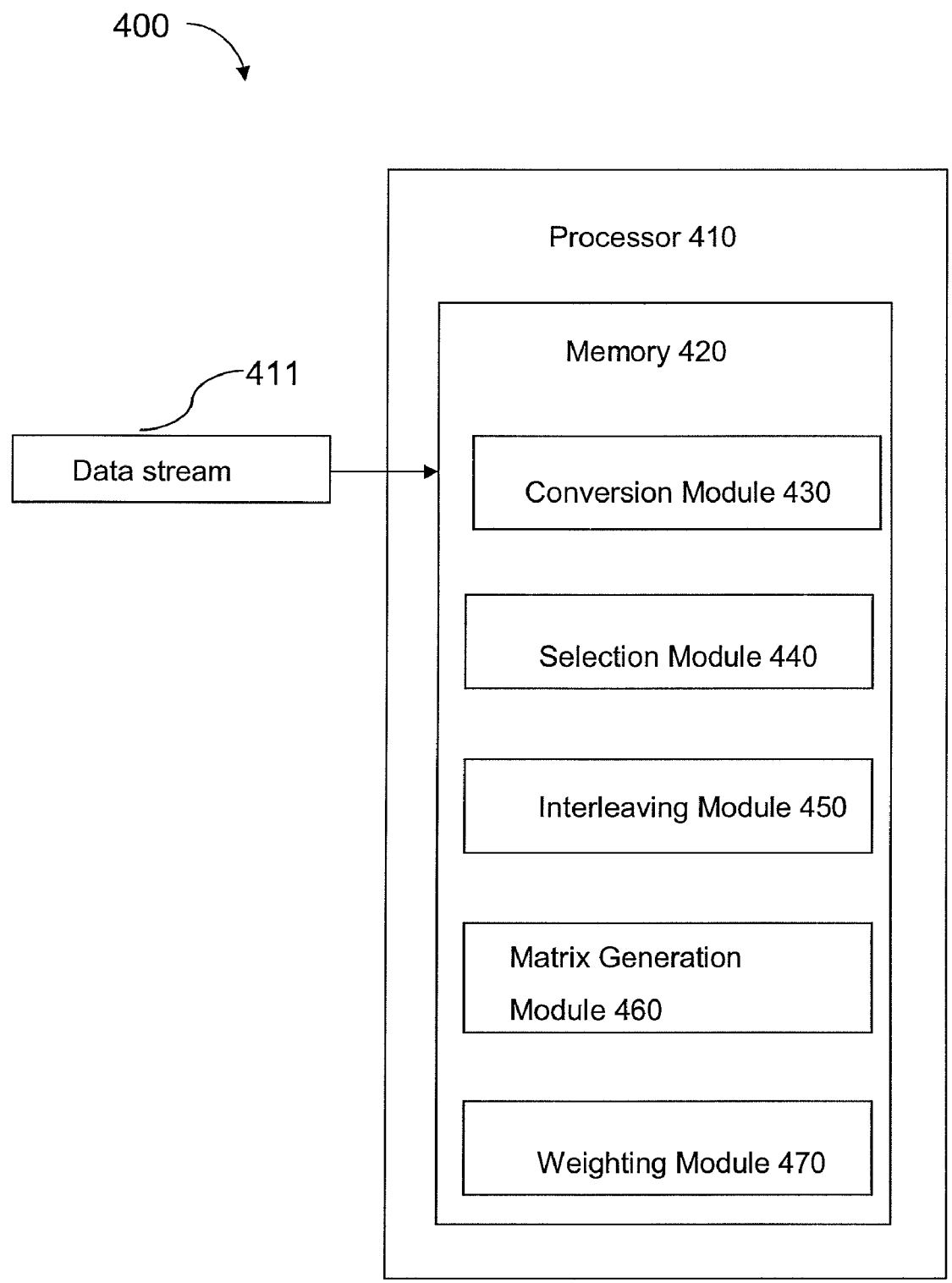
FIG. 4 is a block diagram 400 illustrating the software modules of a computer program executed by a processor.

FIG. 4 is a block diagram illustrating the software modules of a computer program executed by a processor, arranged in accordance with embodiments of the disclosure. The computer program includes a conversion module 430, selection module 440, an interleaving module 450, a matrix generation module 460, and a weighting module 470. In some implementations, the instructions for each of the modules described above are stored in memory 420 and are executed by processor 410. The conversion module 430 converts a data stream 411 into a symbol set. The selection module 440 selects symbols from the converted symbol set. The interleaving module 450 interleaves two selected symbols to generate a new symbol in a manner as set forth above and generates a plurality of such new symbols. The matrix generation module 460 generates a matrix based on the plurality of new symbols. The weighting module 470 weights a plurality of elements of the generated matrix with a predetermined number.

FIG. 5 is a block diagram illustrating a computer program product 500 for transmitting data in a wireless communication system, arranged in accordance with embodiments of the disclosure. Computer program product 500 includes one or more sets of instructions 502 for executing the methods for transmitting data in a wireless communication system. For illustration only, the instructions 502 reflect the method described above and illustrated in FIG. 3. Computer program product 500 may be transmitted in a signal bearing medium 504 or another similar communication medium 506. Computer program product 500 may be recorded in a computer readable medium 508 or another similar recordable medium 510.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for transmitting a data stream in a wireless communication system, comprising:
   converting the data stream to a symbol set;
   selecting a first plurality of symbols from the symbol set, wherein the first plurality of symbols includes at least a first symbol, a second symbol, a third symbol, and a fourth symbol, wherein any of the symbols includes a first part and a second part;
   generating a second plurality of symbols having at least a fifth symbol and a sixth symbol, wherein the fifth symbol includes the first part of the first symbol and the second part of the second symbol and the sixth symbol includes the first part of the third symbol and the second part of the fourth symbol;
   weighting the sixth symbol to form a first weighted symbol; and
   transmitting in a first time slot the fifth symbol with a first antenna and the first weighted symbol with a second antenna.

2. The method of claim 1, further comprising:
   generating a seventh symbol and an eighth symbol, wherein the seventh symbol includes the first part of the second symbol and the second part of the first symbol and the eighth symbol includes the first part of the fourth symbol and the second part of the third symbol;

weighting the eighth symbol to form a second weighted symbol; and transmitting in a second time slot the second weighted symbol with the first antenna and the seventh symbol with the second antenna.

3. The method of claim 1, wherein the first part of each symbol of the first plurality of symbols is different from each other.

4. The method of claim 1, wherein the second part of each symbol of the first plurality of symbols is different from each other.

5. The method of claim 1, wherein the first part of the first symbol is the same as the first part of the second, the third, or the fourth symbol.

6. The method of claim 1, wherein the second part of the first symbol is the same as the second part of the second, the third, or the fourth symbol.

7. The method of claim 1, wherein a weight applied in the weighting step is $e^{j\theta}$, wherein $\theta$ is in a range from zero to around $\pi/2$.

8. The method of claim 1, wherein the magnitude of the first part of a symbol is an in-phase component of the symbol and the magnitude of the second part of the symbol is a quadrature-phase component of the symbol.

9. A wireless communication system, comprising:
a transmitter having a first transmit antenna and a second transmit antenna configured to
convert a data stream to a symbol set;
select a first plurality of symbols from the symbol set, wherein the first plurality of symbols includes at least a first symbol, a second symbol, a third symbol, and a fourth symbol, wherein any of the symbols includes a first part and a second part;
generate a second plurality of symbols having at least a fifth symbol and a sixth symbol, wherein the fifth symbol includes the first part of the first symbol and the second part of the second symbol and the sixth symbol includes the first part of the third symbol and the second part of the fourth symbol;
weight the sixth symbol to form a first weighted symbol; and
transmit in a first time slot the fifth symbol with the first transmit antenna and the first weighted symbol with the second transmit antenna.

10. The wireless communication system of claim 9, wherein the wireless communication system is a multiple input and multiple output (MIMO) system.

11. The wireless communication system of claim 10, wherein the MIMO system comprises two receive antennas at a receiver.

12. The wireless communication system of claim 9, wherein the transmitter is further configured to
generate a seventh symbol and an eighth symbol, wherein the seventh symbol includes the first part of the second symbol and the second part of the first symbol and the eighth symbol includes the first part of the fourth symbol and the second part of the third symbol;
weight the eighth symbol to form a second weighted symbol; and
transmit in a second time slot the second weighted symbol with the first transmit antenna and the seventh symbol with the second transmit antenna.

13. The wireless communication system of claim 12, wherein a weight applied to the eighth symbol is $e^{j\theta}$, wherein $\theta$ is in a range from zero to around $\pi/2$.

14. The wireless communication system of claim 9, wherein the magnitude of the first part of a symbol is an in-phase component of the symbol and the magnitude of the second part of the symbol is a quadrature-phase component of the symbol.

15. A computing device, comprising:
a memory; and
a processor configured to
convert a data stream to a symbol set;
select a first plurality of symbols from the symbol set, wherein the first plurality of symbols includes at least a first symbol, a second symbol, a third symbol, and a fourth symbol, wherein any of the symbols includes a first part and a second part;
generate a second plurality of symbols having at least a fifth symbol and a sixth symbol, wherein the fifth symbol includes the first part of the first symbol and the second part of the second symbol and the sixth symbol includes the first part of the third symbol and the second part of the fourth symbol;
weight the sixth symbol to form a first weighted symbol; and
transmit in a first time slot the fifth symbol with a first antenna and the first weighted symbol with a second antenna.

16. The computing device of claim 15, wherein the processor is further configured to
generate a seventh symbol and an eighth symbol, wherein the seventh symbol includes the first part of the second symbol and the second part of the first symbol and the eighth symbol includes the first part of the fourth symbol and the second part of the third symbol;
weight the eighth symbol to form a second weighted symbol; and
transmit in a second time slot the second weighted symbol with the first antenna and the seventh symbol with the second antenna.

17. The computing device of claim 16, wherein a weight applied to the sixth symbol and to the eighth symbol is $e^{j\theta}$, wherein $\theta$ is in a range from zero to around $\pi/2$.

18. A non-transitory computer-readable medium containing a sequence of instructions, which when executed by a computing device, causes the computing device to:
convert a data stream to a symbol set;
select a first plurality of symbols from the symbol set, wherein the first plurality of symbols includes at least a first symbol, a second symbol, a third symbol, and a fourth symbol, wherein any of the symbols includes a first part and a second part;
generate a second plurality of symbols having at least a fifth symbol and a sixth symbol, wherein the fifth symbol includes the first part of the first symbol and the second part of the second symbol and the sixth symbol includes the first part of the third symbol and the second part of the fourth symbol;
weight the sixth symbol to form a first weighted symbol; and
transmit in a first time slot the fifth symbol with a first antenna and the first weighted symbol with a second antenna.

19. The non-transitory computer-readable medium of claim 18, further including a sequence of instructions, which when executed by the computing device, causes the computing device to
generate a seventh symbol and an eighth symbol, wherein the seventh symbol includes the first part of the second symbol and the second part of the first symbol and the eighth symbol includes the first part of the fourth symbol and the second part of the third symbol;

weight the eighth symbol to form a second weighted symbol; and transmit in a second time slot the second weighted symbol with the first antenna and the seventh symbol with the second antenna.

20. The non-transitory computer-readable medium of claim 19, wherein a weight applied to the sixth symbol and to the eighth symbol is $e^{j\theta}$, wherein $\theta$ is in a range from zero to around $\pi/2$.

* * * * *

UNITED STATES PATENT AND TRADEMARK OFFICE
CERTIFICATE OF CORRECTION

PATENT NO. : 8,279,964 B2
APPLICATION NO. : 12/420968
DATED : October 2, 2012
INVENTOR(S) : Rajan et al.

It is certified that error appears in the above-identified patent and that said Letters Patent is hereby corrected as shown below:

In the Specification

In Column 2, Line 61, delete "covert" and insert -- convert --, therefor.

In Column 3, Line 40, delete "contellation" and insert -- constellation --, therefor.

In Column 4, Line 26, delete "$\cos(\theta)+j\ \sin(\theta)$," and insert -- $\cos(\theta)+j\sin(\theta)$, --, therefor.

Signed and Sealed this
Eleventh Day of June, 2013

Teresa Stanek Rea
*Acting Director of the United States Patent and Trademark Office*